United States Patent [19]

Wagner et al.

[11] Patent Number: 4,975,021
[45] Date of Patent: Dec. 4, 1990

[54] ROTOR, IN PARTICULAR A HELICOPTER ROTOR

[75] Inventors: Alois Wagner, Emmerkofen; Otmar Friedberger, Neubiberg, both of Fed. Rep. of Germany

[73] Assignee: Messerschmitt-Bölkow-Blohm GmbH, Münich, Fed. Rep. of Germany

[21] Appl. No.: 383,861

[22] Filed: Jul. 21, 1989

[30] Foreign Application Priority Data

Jul. 21, 1988 [DE] Fed. Rep. of Germany ....... 3824815

[51] Int. Cl.$^5$ ............................................. B64C 27/51
[52] U.S. Cl. ................................. 416/134 A; 416/140
[58] Field of Search .......... 416/134 A, 138 A, 140 A, 416/141 R

[56] References Cited

U.S. PATENT DOCUMENTS

| | | | |
|---|---|---|---|
| 4,087,203 | 5/1978 | Ferris | 416/138 A |
| 4,222,709 | 9/1980 | Mouille | 416/134 A |
| 4,227,859 | 10/1980 | Gouzien et al. | 416/134 A |
| 4,244,677 | 1/1981 | Noehren et al. | 416/134 A |
| 4,273,511 | 6/1981 | Mouille et al. | 416/138 A X |
| 4,299,538 | 11/1981 | Ferris et al. | 416/134 A |
| 4,332,525 | 6/1982 | Cheney | 416/134 A |
| 4,381,902 | 5/1983 | Head et al. | 416/134 A |
| 4,427,340 | 1/1984 | Metzger et al. | 416/134 A X |
| 4,676,720 | 6/1987 | Niwa et al. | 416/134 A |
| 4,690,616 | 9/1987 | Hahn et al. | 416/140 A X |
| 4,778,343 | 10/1988 | Hahn et al. | 416/134 A |

FOREIGN PATENT DOCUMENTS

| | | |
|---|---|---|
| 3241754 | 2/1986 | Fed. Rep. of Germany . |
| 3534968 | 2/1987 | Fed. Rep. of Germany . |
| 2001025 | 1/1979 | United Kingdom . |

Primary Examiner—John T. Kwon
Attorney, Agent, or Firm—Kenyon & Kenyon

[57] ABSTRACT

A rotor, in particular a helicopter rotor, whereby the movement of the pitch angle of the rotor blade relative to a rotor hub is provided either by a blade neck with torsional flexibility disposed between a blade root and a blade wing or by a blade connection on a rotor hub arm with torsional flexibility. The pitch angle control for the blade is provided by a steering rod coupled to a torsionally stiff blade control casing extending coaxially without making contact along the blade neck or the rotor hub arm up to the blade wing or to the blade root. The control casing is supported on the blade root or rotor hub by at least one brace, which brace, in the longitudinal direction of the blade, has a T-shape. The vertical section of the T-shape is coupled to the blade control casing and the T-base is coupled with torsional flexibility to the blade root or the rotor hub arm, whereby the connection to the base is limited to both of the extremities of the base. Thus, the brace provides both a supporting function for the blade control casing and acts as a torsion bearing that enables rotational movement of the blade control casing and thus change of the blade pitch angle.

10 Claims, 2 Drawing Sheets

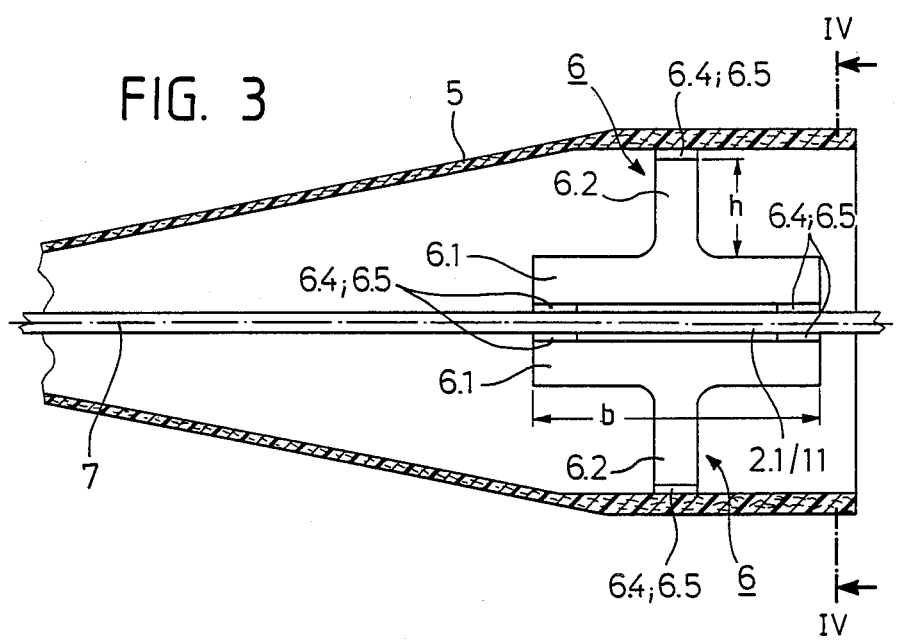
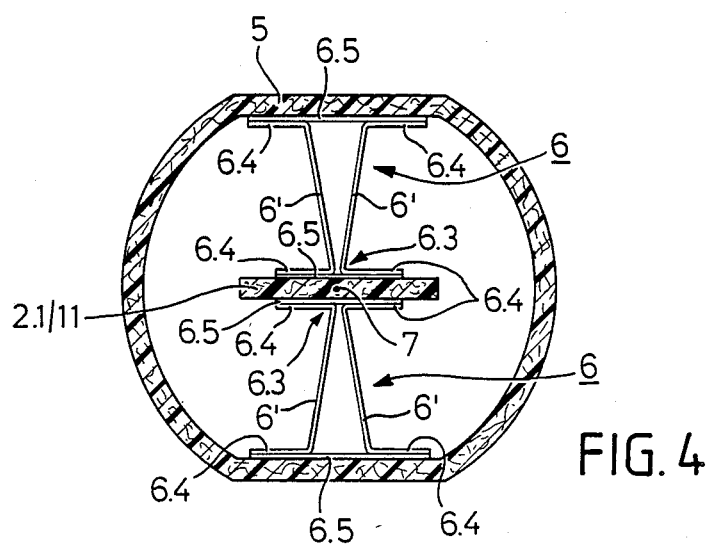

ROTOR, IN PARTICULAR A HELICOPTER ROTOR

BACKGROUND OF THE INVENTION

The present invention relates to a rotor, and, in particular, a helicopter rotor.

In the case of such a rotor known from German Patent No. 32 41 754 or German Patent No. 35 34 968, an articulated bearing of a brace guarantees the movements required for a blade control element relative to a blade root or rotor hub.

This articulated bearing entails relatively high maintenance costs. As experience shows, this is especially true, for example, in the application of a metal articulation, which is subject to greater wear than an elastomer bearing. However, in the case of an elastomer bearing, the casing support represents a considerable portion of the weight of the articulated bearing, above all when a long-lasting design is required of the elastomer bearing. In that case, the articulated bearing can weigh considerably more than when a metal articulation is used.

SUMMARY OF THE INVENTION

Thus, in the case of a rotor of the above mentioned type, an object of the present invention is to dispense altogether with a separate articulated bearing to support the blade control casing on the side of the blade root or rotor hub.

The above and other objects of the invention are achieved by a rotor, in particular a helicopter rotor, whereby the pitch angle movements of the individual rotor blade relative to rotor hub is either guaranteed by a blade neck with torsional flexibility between a blade root and a blade wing or by a blade connection on a rotor hub arm with torsional flexibility, and the pitch angle control for the blade results by means of a steering rod by way of a torsionally stiff blade control casing extending in a coaxial arrangement without making contact along the blade neck or the rotor hub arm up to the blade wing or to the blade root and this control casing is supported on the blade root or rotor hub arm side by means of at least one brace, wherein the longitudinal direction of the blade control casing, the brace shows a T-profile whose web is assigned to the blade control casing and whose base is assigned with torsional flexibility to the blade root or the rotor hub arm, whereby its connection to the base is limited to both of its extremities.

Accordingly, the respective brace is of such a refinement and arrangement, that it not only can fulfill the required supporting function for the blade control casing as a result of the appropriate rigidity in flapwise direction, chordwise direction as well as in the longitudinal direction of the blade or the direction of the blade's centrifugal force effect, but at the same time is also effective as a torsion bearing of the same. This means, it enables chordwise angle movements of the blade control casing relative to the blade root or rotor hub arm. In this connection, the web acts as a lever arm, which can swivel by the movements of blade control casing and which subjects the base to torsional stress between its two ends which are fixed at blade root or rotor hub arm, when the blade is adjusted for angularity. This effect can be improved further with the T-profile formation.

In addition to this, the brace has the considerable advantage, according to an embodiment of the invention, that its rigidity in flapwise and chordwise direction can be variably adjusted by selecting the angle between the profile sides (plates) accordingly. One makes this adjustment when designing the brace, according to the bearing pressure of the blade control casing (by means of the pitch angle control for the blade). For example, the requirement that the brace have greater rigidity in flapwise direction can be fulfilled by a relatively small side angle.

Finally, in accordance with a preferred embodiment of the invention, which requires relatively modest constructional expenditure, the invention is especially advantageous for structures made of fiber-reinforced plastic.

BRIEF DESCRIPTION OF THE DRAWINGS

The invention will be described in greater detail in the following detailed description with reference to the drawings, in which:

FIG. 3 is a longitudinal cross-section through a section of the arrangement of FIG. 1 or 2 on the end of a blade control means on the rotor hub-side; and FIG. 4 is a section along line IV—IV of FIG. 3.

DETAILED DESCRIPTION

Figure 1:
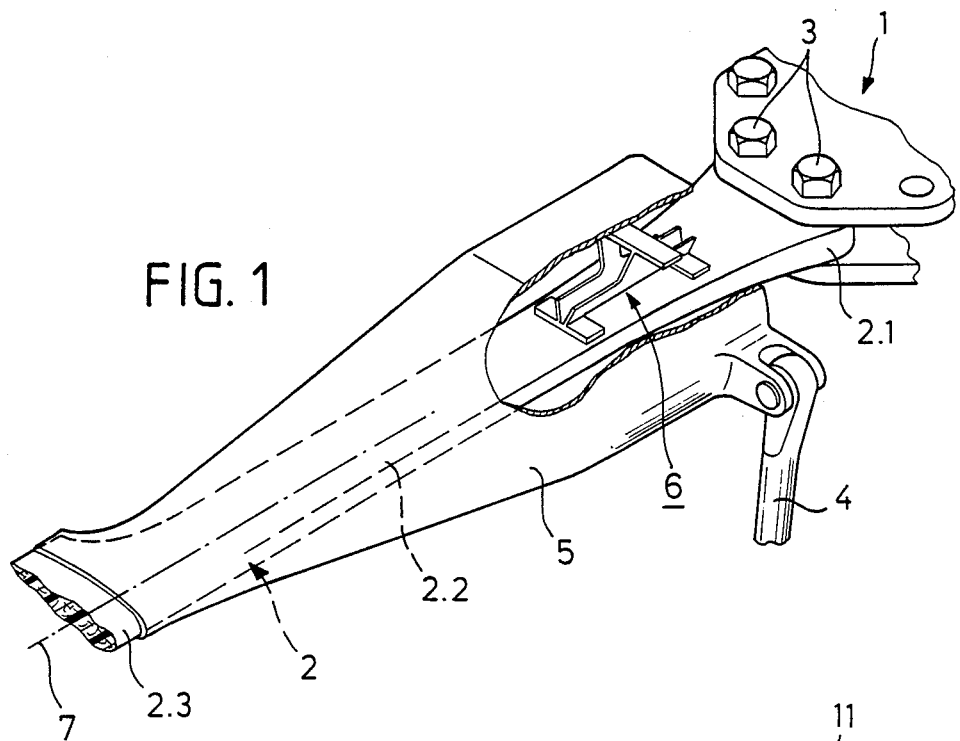
FIGS. 1 and 2 respectively, show in perspective views, rotor blade connections for a helicopter.
Figure 2:
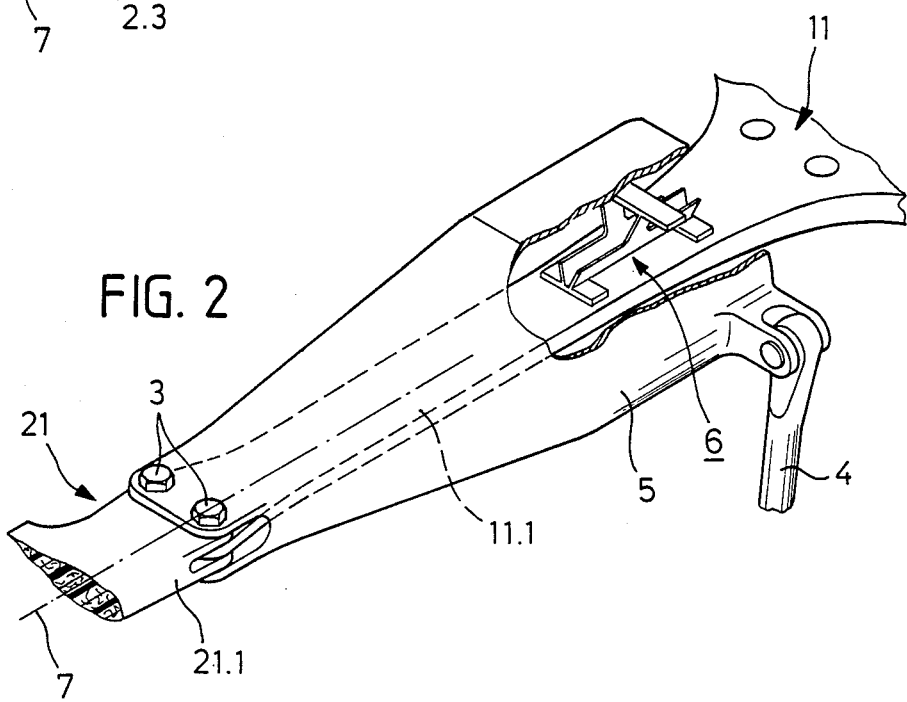

According to FIGS. 1 and 2, in the case of an rotor hub 1 or 11, respectively, the connection of the individual rotor blade 2 or 21, made, for example, of fiber-reinforced plastic, is established by means of bolts 3, which traverse its blade root 2.1 or 21.1 in the direction of thickness. Given such a rigid blade connection, to guarantee that the rotor blade 2 or 21 can still perform adjustments for pitch angle as well as movements in flapwise and chord direction, in accordance with FIG. 1, a blade neck 2.2, which extends between a blade root 2.1 and a blade wing 2.3, is arranged not only with torsional flexibility, but also with flapwise and chordwise flexibility. This is achieved with a relatively elongated and flat specific embodiment of the blade neck, as represented, for example, made of strands of fiber with a predominantly unidirectional fibrous orientation in the longitudinal direction of the blade. Alternatively, in the case of the rotor hub 11 (for example made of fiber-reinforced plastic), such a specific embodiment is provided in accordance with FIG. 2 for the individual rotor hub arm 11.1, compared to which the "simple" rotor blade 21 is relatively flexurally and torsionally stiff.

In both cases (FIGS. 1 and 2), the means for adjusting the pitch angle with a steering rod 4 is a blade control casing 5, known from the German patents mentioned in the beginning, which, in a coaxial arrangement, extends along the blade neck 2.2 (FIG. 1) or the rotor hub arm 11.1 (FIG. 2) up to the blade wing 2.3 (FIG. 1) or to the blade root 21.1 (FIG. 2). This blade control casing 5 must be supported with angle of rotation mobility on the rigid blade root 2.1 (FIG. 1) or the rotor hub 11 or on a substantially rigid section of the allocated rotor hub arm 11.1 (such as a blade root). For this purpose, a brace 6 is provided on both sides of the blade root 2.1 or the rotor hub 11 respectively. Besides the supporting function, this brace also assumes the function of a torsion bearing for the blade control casing 5. To fulfill this double function, in accordance with FIG. 3, the individual brace 6 comprises a T-profile in the longitudinal direction of the blade control casing 5 with a base 6.1, which has torsional flexibility and whose width b is greater than the height h of the web 6.2, which, on the other hand, is relatively stiff. Thereby, the web 6.2 is assigned to the blade control casing 5 and the blade root 2.1 (FIG. 1) or the rotor hub 11 (FIG. 2) is assigned to the base 6.1. Finally, a connection is established between the blade root 2.1 or the rotor hub 11 only with both ends of this base 6.1, which extends in the longitudinal direction of the blade control casing 5, between which it extends, therefore, without making contact, as shown especially in FIG. 3. Accordingly, the base 6.1 can be subjected to torsional stress, as soon as the web 6.2 is tilted as the result of pitch angle movements of the blade control casing 5.

As FIG. 4 shows clearly, the individual brace 6 consists preferably of two plates 6' with torsional and bending flexibility, which are assembled in the blade chord direction to form a V-profile which is symmetrical relative to the flap plane, whereby the profile sides have such a distance at profile root 6.3 assigned to the blade root 2.1 or the rotor hub 11, that the axes of the profile sides intersect in the angular axis or the longitudinal axis 7 of the blade. The advantage of this configuration, as already mentioned, is that the rigidity of the individual brace 6 can be adjusted according to need by way of the angle between both plates.

Finally, as a result of the selected plate shape, a simpler brace design is also guaranteed, which is especially suited for a construction of fiber-reinforced plastic, which, for example, can be joined with the blade root 2.1 or the rotor hub 11 and the blade control casing 5 through a simple adhesion. Furthermore, all that is needed is the precautionary measures, apparent in FIG. 4, according to which, both paired flat spring plates 6' are joined respectively to the brace 6 over fixing brackets 6.4 bent on the three ends of its T-profile (FIG. 3) by means of a fixing bracket 6.5 uniting these (per pair). Thus, the brace 6 can be a component prefabricated as a one-piece unit. In the preferred embodiment made of fiber-reinforced plastic, the brace 6 is maintenance-free and can be designed practically for an unlimited lifetime.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A helicopter rotor comprising a rotor blade coupled to a rotor hub, the rotor blade having a blade root portion coupled to the hub, a torsionally flexible blade neck portion and a blade wing portion, the blade neck portion being disposed between the blade root portion and the blade wing portion, the rotor comprising a torsionally stiff blade control casing extending coaxially about the blade neck portion between the blade root portion of the rotor blade and the blade wing portion, said control casing not making contact with said rotor blade along the neck portion of the blade and being coupled to the blade wing portion, said rotor further comprising means for controlling the pitch angle of the rotor blade relative to the rotor hub, said means for controlling the pitch angle comprising a steering rod coupled to said control casing, said control casing being braced at the blade root portion by a brace, said brace comprising a T-shaped element extending between said blade root portion and said control casing, said T-shaped element having a substantially horizontal member and a substantially vertical member and being disposed such that the substantially horizontal member is adjacent the blade root portion, said substantially horizontal member having brackets at ends thereof fixed to said blade root portion, said substantially vertical member having at an end thereof adjacent the control casing a bracket fixed to said control casing, said substantially horizontal member of said T-shaped element being torsionally flexible, said brace being coupled to said rotor blade root portion only by said brackets at the ends of said substantially horizontal member.

2. The rotor recited in claim 1, wherein a width of the substantially horizontal member of the T-shaped element is greater than the height of said substantially vertical member of said T-shaped element.

3. The rotor recited in claim 1, wherein the brace comprises at least two T-shaped elements having torsional and bending flexibility assembled between said control casing and said rotor blade root portion having a V profile in cross-section, the V profile being symmetrical relative to the plane of the rotor blade, the V profile having a root coupled to the blade root portion with a distance between the T-shaped elements at the root such that axes of the T-shaped elements intersect in a longitudinal axis of the blade.

4. The rotor recited in claim 3, wherein the T-shaped elements comprise flat springs made of fiber reinforced plastic.

5. The rotor recited in claim 3, wherein the brackets of the T-shaped elements are coupled together by a further fixing bracket, a fixing bracket being disposed between said brackets at ends of the substantially horizontal members and said rotor blade neck portion and between said brackets at ends of the substantially vertical members and said control casing.

6. A helicopter rotor comprising a rotor blade coupled to a rotor hub, the rotor hub having a torsionally flexible hub arm, the rotor blade having a blade root portion coupled to the hub arm, the rotor comprising a torsionally stiff blade control casing extending coaxially along the hub arm to the blade root portion, said control casing not making contact with said hub arm and being coupled to the blade root portion, said rotor further comprising means for controlling the pitch angle of the rotor blade relative to the rotor hub, said means for controlling the pitch angle comprising a steering rod coupled to said control casing, said control casing being braced at the hub arm by a brace, said brace comprising a T-shaped element extending between said hub arm and said control casing, said T-shaped element having a substantially horizontal member and a substantially vertical member and being disposed such that the substantially horizontal member is adjacent the hub arm, said substantially horizontal member having brackets at ends thereof fixed to said hub arm, said substantially vertical member having at an end thereof adjacent the control casing a bracket fixed to said control casing, said substantially horizontal member of said T-shaped element being torsionally flexible, said brace being coupled to said hub arm only by said brackets at the ends of said substantially horizontal member.

7. The rotor recited in claim 6, wherein a width of the substantially horizontal member of the T-shaped element is greater than the height of said substantially vertical member of said T-shaped element.

8. The rotor recited in claim 6, wherein the brace comprises at least two T-shaped elements having torsional and bending flexibility assembled between said control casing and said hub arm to form a V profile in cross-section, the V profile being symmetrical relative to the plane of the rotor blade, the V profile having a root coupled to the hub arm with a distance between the T-shaped elements at the root such that axes of the T-shaped elements intersect in a longitudinal axis of the blade.

9. The rotor recited in claim 8, wherein the T-shaped elements comprise flat springs made of fiber reinforced plastic.

10. The rotor recited in claim 8, wherein the brackets of the T-shaped element are coupled together by a further fixing bracket, a fixing bracket being disposed between said brackets at ends of the substantially horizontal members and said hub arm and between said brackets at ends of the substantially vertical members and said control casing.

* * * * *